C. A. ELIGH.
DEVICE FOR SIMULTANEOUSLY PERFORMING TWO OPERATIONS ON AN ARTICLE.
APPLICATION FILED AUG. 12, 1915.
1,205,605.                                  Patented Nov. 21, 1916.
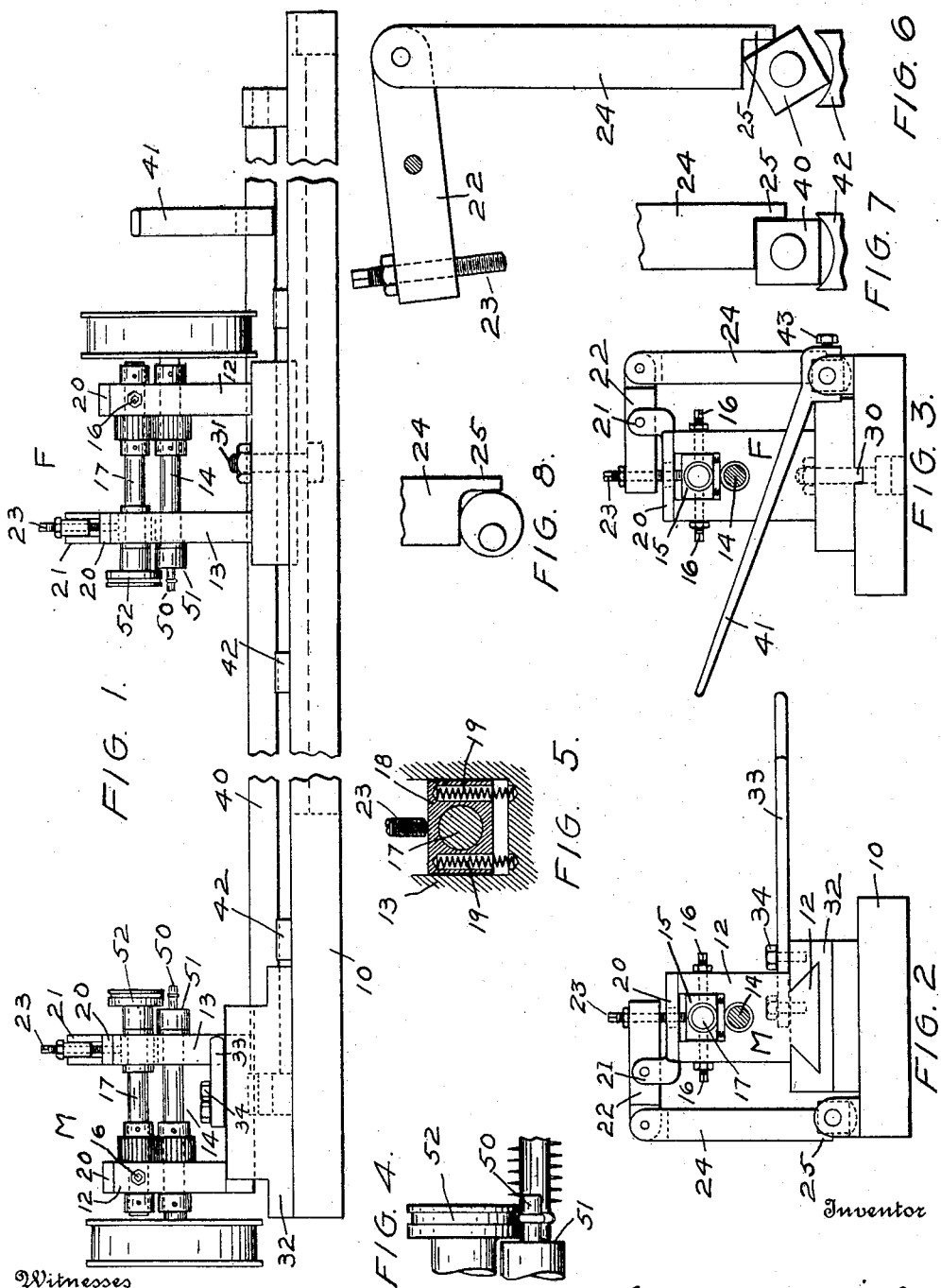

UNITED STATES PATENT OFFICE.

CHARLES A. ELIGH, OF DETROIT, MICHIGAN, ASSIGNOR TO LONG MANUFACTURING COMPANY, OF DETROIT, MICHIGAN, A CORPORATION OF MICHIGAN.

DEVICE FOR SIMULTANEOUSLY PERFORMING TWO OPERATIONS ON AN ARTICLE.

1,205,605.   Specification of Letters Patent.   Patented Nov. 21, 1916.

Application filed August 12, 1915. Serial No. 45,200.

*To all whom it may concern:*

Be it known that I, CHARLES A. ELIGH, a citizen of the United States, residing at Detroit, in the county of Wayne and State of Michigan, have invented a certain new and useful Device for Simultaneously Performing Two Operations on an Article, of which the following is a full, clear, and exact description.

My invention relates to a class of devices designed to simplify and reduce the cost of certain manufacturing operations. Several features contribute to this end in the present device. It is adjustable so as to operate on tubes of various lengths, and this adjustment is semi-automatic; *i. e.*, if adjusted within certain relatively broad limits, exact adjustment is automatically attained in operation of the device. For this reason a skilled operator is not required and no time is lost in making close adjustments. The operating connections remain undisturbed when adjustments for different lengths of tubes is made which again avoids loss of time. Two levers are provided, one used in inserting and removing tubes, the other to operate the device after a tube is in place. These levers are so located as to afford the maximum of convenience and enable the operator to reduce to the minimum the number of movements used in operating the device.

In the accompanying drawing: Figure 1 is a front elevation of my device; Fig. 2 is an elevation of the left hand end, and Fig. 3 is an elevation of the right hand end thereof. Fig. 4 is an enlarged detail showing the operation performed on the ends of the tubes. Fig. 5 is a detail section through one of the bearings 13, in Fig. 1, showing the springs for lifting the movable roller. Fig. 6 is a detail showing the operation of the cam shaft. Fig. 7 is a detail showing the cam shaft in normal position. Fig. 8 is a modified form of cam shaft.

Similar numerals refer to similar parts in all of the views.

Upon the bed 10 two independent beading machines are mounted. As these machines are substantially alike a description of one will serve for both. The base 11 has two uprights, 12 and 13, carrying bearings in which a shaft 14 rotates, the shaft being otherwise stationary. In a recess in the upright 12, above shaft 14, a bearing 15 is mounted on pivots 16, a shaft 17 rotating therein. This shaft passes through a bearing 18 arranged to slide in a recess in upright 13, Fig. 5, which bearing is normally lifted by compression springs 19 inclosed in holes in the bearing. A yoke 20 is secured to the top of each upright and the one on upright 13 has an extension 21 on which is pivoted a lever 22. One end of the lever has a set screw 23 whose lower end bears on the bearing 18, and at the other end the lever carries a depending link 24, the lower end of the link having a lug 25.

The beading machines differ in one respect; namely, one is normally fixed on the bed and is therefore indicated by F, while the other is movable on the bed and therefore indicated by M. The base of machine F has a rib 30 fitting in a slot in the bed, keeping the machine in proper alinement on the bed but permitting it to slide to and fro. By means of a bolt 31 passing through the slot and base the machine is secured at any desired point. Machine M has a sub-base 32 on which it is arranged to slide and a lever 33 pivoted to the sub-base at 34 is attached to the machine by a slot and pin connection. With this lever the machine may be moved to and fro on the sub-base, the latter being fixed on the bed.

A square rock shaft 40 is mounted on the bed and passes both machines contiguous to the lower ends of links 24. The ends of the links are flat and a flat side of the shaft is normally opposed to them. When the shaft is rocked the corner of the shaft lifts the link and by this means the levers 22 are rocked, pressing the free end of shaft 17 downward. In Fig. 8 the shaft is cylindrical and mounted on trunnions set off center. In either case the lug 25 acts as a sort of guard to keep the link from slipping off of the shaft; also to prevent the links swinging. The shaft is rocked with a lever 41 secured to the shaft with a set screw 43. To prevent the shaft springing downward semi-bearings 42 may be distributed along under it. The links maintain their positions over the shaft by gravity, and it is evident that the shaft is enabled to lift them whatever the position of the machines with reference to each other or to the bed.

As is customary in beading machines the shafts are geared together and the lower shaft has a beading roll 50 projecting from a shoulder 51. This roller is of such size as is necessary to allow it to withdraw from the tube after the bead is formed. A complementary beading roller 52 is carried by shaft 17. The operation of these rollers will be readily understood, particularly after referring to Fig. 4. When a tube is to be inserted the machine M is moved far enough to permit the tube to slip on the rolls 50; it is then moved until both shoulders 51 touch the end of the tube. The bead will then be rolled just as far from each end of the tube as the beads on the rolls are removed from the shoulders. To accommodate different lengths of tube the machine F is moved one way or the other. As the movement of machine M may be considerably greater than is actually necessary for the insertion and removal of tubes it follows that machine F may be located anywhere within certain limits, the machine M being moved a greater or less distance, according to the position of machine F, until stopped by the shoulders 51 impinging on the ends of the tube. This therefore renders the adjustment, in a sense, automatic. Moving the machines does not affect the relations of the links with the cam shaft.

This device may be used for a variety of purposes. In the present drawings it is represented as forming beads on tubes for radiators for automobiles, a portion of the tube being shown between the rollers in Fig. 4. It is assumed that the tubes are furnished to the operator cut to the required length, and he, by merely seeing that the shoulders are in contact with the ends of the tube before he operates the lever 41, is bound to form the beads a definite distance from the ends of the tubes. Evidently neither this nor adjusting the device for different lengths requires any skill or special training.

I do not wish to be understood as limiting myself to the particular structure herein shown as I am aware that minor changes therein are possible within the scope of my claims.

What I claim is as follows:

1. A device for simultaneously forming a bead on each end of a tube, comprising a bed carrying two beading machines, each having a stationary and a laterally movable roller, the latter being normally held away from the former, and each machine carrying a member whereby the latter roller is moved toward the former, one of the machines being normally fixed and the other movable on the bed; a lever to move the latter machine to and fro with reference to the former, and a rock shaft mounted on the bed and extending past both machines so as to be contiguous to said operating members, said shaft having the character of a cam and adapted when rocked to engage said members, whatever the position of the machines with reference to each other or to the bed, and simultaneously press the movable rollers against the stationary ones.

2. A device for simultaneously forming a bead on each end of a tube, comprising a bed carrying two beading machines, each having a stationary beading roller to enter the tube, with a shoulder to limit the distance it enters the tube, a laterally movable roller and a member to press said roller against the stationary roller, said machines being adapted to operate in various positions with reference to each other and to the bed and one of them being movable on the bed; a lever for moving the movable machine to and fro with reference to the other machine, and a rock shaft mounted on the bed and extending past both machines contiguous to the aforesaid members, whatever the positions of the machines with reference to each other or to the bed, said shaft having the character of a cam and adapted when rocked to move said members and press the movable roller against the stationary one.

3. A device for simultaneously performing two operations on an article, comprising a bed carrying two independent machines, the operations performed by said machines requiring them to be operative at various distances from each other, each machine carrying a member whereby it is operated; and a rock shaft mounted on the bed and extending past both machines contiguous to said members whatever the positions of the machines with reference to each other or the bed, said shaft having the character of a cam adapted when rocked to lift the operating members, thereby simultaneously operating both machines.

4. A device for simultaneously performing two operations on an article, comprising a bed carrying two independent machines, one of which is movable to and fro on the bed, and a lever for moving said machine; the other machine being normally fixed with reference to the bed but having means for fixing it at various points thereon, each of said machines carrying a member whereby it is operated; and a rock shaft mounted on the bed and extending past both machines so as to be contiguous to said operating members whatever the positions of the machines with reference to each other or to the base, said shaft having the character of a cam and adapted when rocked to move the members and thereby simultaneously operate both machines.

In testimony whereof I affix my signature in the presence of two subscribing witnesses.

CHARLES A. ELIGH.

Witnesses:
J. L. DRYDEN,
J. VERNON KEMP.

Copies of this patent may be obtained for five cents each, by addressing the "Commissioner of Patents, Washington, D. C."